United States Patent [19]

Price et al.

[11] Patent Number: 4,536,062
[45] Date of Patent: Aug. 20, 1985

[54] THERMAL STABILIZATION FOR AN ACOUSTO-OPTIC DEVICE

[75] Inventors: Michael G. Price, Seabrook; Otis G. Zehl; Robert D. Bonney, both of College Park, all of Md.

[73] Assignee: Litton Systems, Inc., College Park, Md.

[21] Appl. No.: 400,466

[22] Filed: Jul. 21, 1982

[51] Int. Cl.³ .............................................. G02F 1/11
[52] U.S. Cl. ................................. 350/358; 372/34; 372/36
[58] Field of Search ..................... 350/358; 372/34, 36

[56] References Cited

U.S. PATENT DOCUMENTS 4,124,281  11/1978  Berg et al. .............................. 350/358
4,351,051   9/1982  van Alem et al. ...................... 372/36
4,429,394   1/1984  Guch, Jr. ............................. 372/36 X

*Primary Examiner*—John K. Corbin
*Assistant Examiner*—Lynn Vandenburgh Kent
*Attorney, Agent, or Firm*—Robert F. Rotella; Michael H. Wallach

[57] ABSTRACT

An acousto-optic device is shown which permits the use of a temperature sensitive solid state laser. The laser is mounted in a heat sink that displaces the laser as a function of temperature in a direction which cancels the drift of the laser's blur spot due to the laser's increased wavelength as a function of temperature.

11 Claims, 7 Drawing Figures

THERMAL STABILIZATION FOR AN ACOUSTO-OPTIC DEVICE

BACKGROUND OF THE INVENTION

1. Field of the Invention

The present invention relates to an apparatus for improved control of the blur spot drift in an acousto-optic device due to the thermal response of a solid state laser source.

2. Description of Prior Art

The term acousto-optics (A/O) refers to an interaction of light and sound. Typically an RF input signal is first transformed into an acoustic wave in a suitable crystal material, such as lithium niobate. Variation in index of refraction due to the propagation of the acoustic wave within the crystal can be then used to deflect a beam of light, usually monochromatic. This process is the equivalent of the better known Bragg diffraction of X-rays from the planes of a crystal lattice; for this reason the device is called a Bragg deflector or Bragg cell as well as an acousto-optic deflector or modulator. The angular deflection of the optical beam is proportional to the frequency of the original RF input signal. As the process is linear, multiple simultaneous RF input signals yield multiple simultaneous beam deflections corresponding to the distinct input frequencies with the intensity of the individual deflected beams being proportional to the power of the original RF input signals.

Acousto-optics have been used for a variety of applications where light must be modulated or deflected. An important application is the use of acousto-optics for wideband receiving systems. The acousto-optic phenomenon occurs over a substantial bandwidth, 1 GHz with existing devices, so that the frequency content of an unknown signal environment can be resolved by measuring the angle of deflection corresponding to each signal in the environment. Thus, the entire signal environment may be viewed simultaneously by a device that acts like a channelized receiver.

Due to its inherent temperature stability, a helium neon (HeNe) laser has been the laser of choice for use in an acousto-optic device or system. In recent years, the small size and weight, lower power consumption, and high efficiency of a gallium arsenide (GaAs) based solid state laser has made it an attractive alternative to an HeNe laser. This is particularly true for airborne A/O receiver applications, and other contexts where these advantages offer improved functional performance.

The major disadvantage associated with the GaAs class of solid state laser is strong thermal dependence, because lasing action is related to band gap width which is a function of temperature. Thermal variation of both optical power and wavelength can be observed for devices of this type. Optical power variation can be monitored and controlled, but wavelength variation is a more difficult problem.

A need continues to exist for controlling either laser wavelength or for forcing an acousto-optic device or system to have a small sensitivity to laser wavelength variation.

The only prior art approach which successfully addresses this problem is to imbed the entire optical package in a refrigerator/oven, thus allowing regulation of temperature and minimizing temperature variation.

SUMMARY OF THE INVENTION

Accordingly, an important object of the present invention is to control or obviate frequency measurement error in an acousto-optic device using a sold state laser, where such frequency error is substantially caused by a change in laser wavelength due to a change in laser operating temperature.

The technique used in the present invention is precise design of a laser heat sink so that, as the laser temperature changes, thermal expansion of the heat sink changes the pointing angle of the laser in such a fashion as to cause blur spot motion due to laser wavelength temperature drift to be cancelled.

BRIEF DESCRIPTION OF THE DRAWINGS

Other objects and advantages of the present invention will become apparent to those skilled in the art after consideration of the following specification and drawings wherein.

DETAILED DESCRIPTION OF PREFERRED EMBODIMENTS

Figure 1:
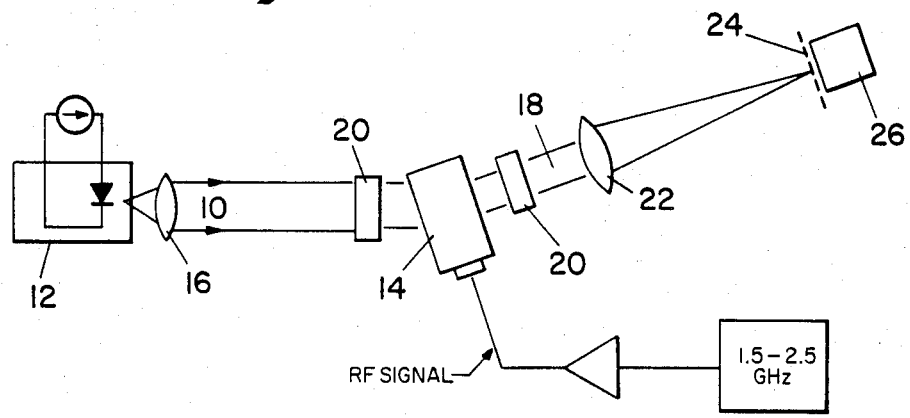
FIG. 1 is a schematic diagram of an acousto-optic deflector device of the prior art incorporating a GaAs solid state laser source.

Typical operation of a prior art acousto-optic frequency-measuring device is shown in FIG. 1. Electromagnetic energy, in the form of a light beam 10, from a laser source 12 is directed to an acousto-optic modulator or Bragg cell 14 by a laser lens 16 where a portion of that light beam 10 is deflected by diffraction, caused by the passage of an acoustic energy wave through the medium of the cell, into a deflected or first order beam 18 with the remainder of the undeflected or zero order beam stopped by an optical stop, not shown. A cylinder lens pair 20 serves to compress the light into the Bragg cell acoustic wave and recollimate it upon exiting the Bragg cell. The deflected light beam 18 passes through a transform lens 22 and appears as a blur spot in the focal plane 24, where its position and intensity are sensed by photosensor means 26.

Figure 2:
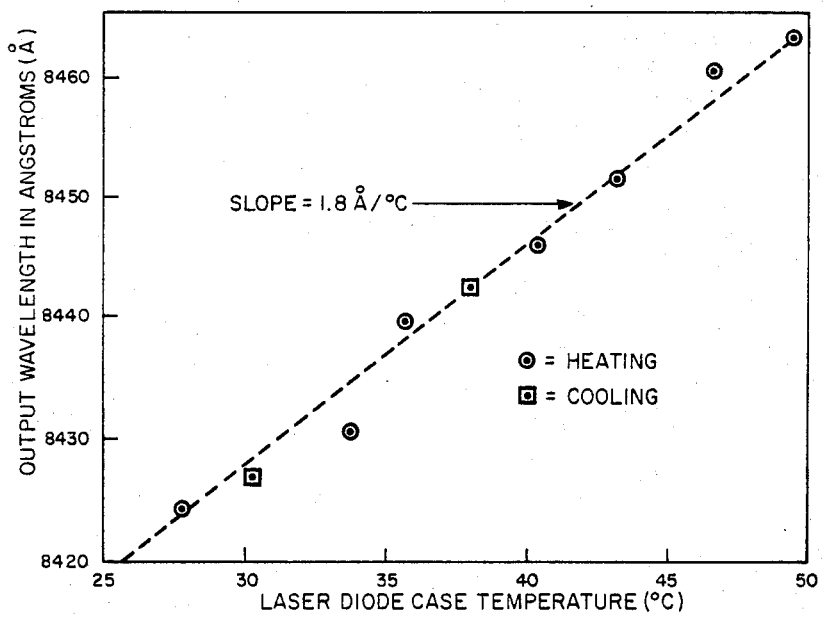
FIG. 2 is an experimental measurement of a typical GaAs laser wavelength versus temperature characteristics.

FIG. 2 shows experimental measurements of optical output wavelength in Angstroms as a function of laser diode case temperature in degrees Centigrade for a typical laser diode. Wavelength changes of 2-3 Å/°C. are typical for lasers of this class.

Figure 3:
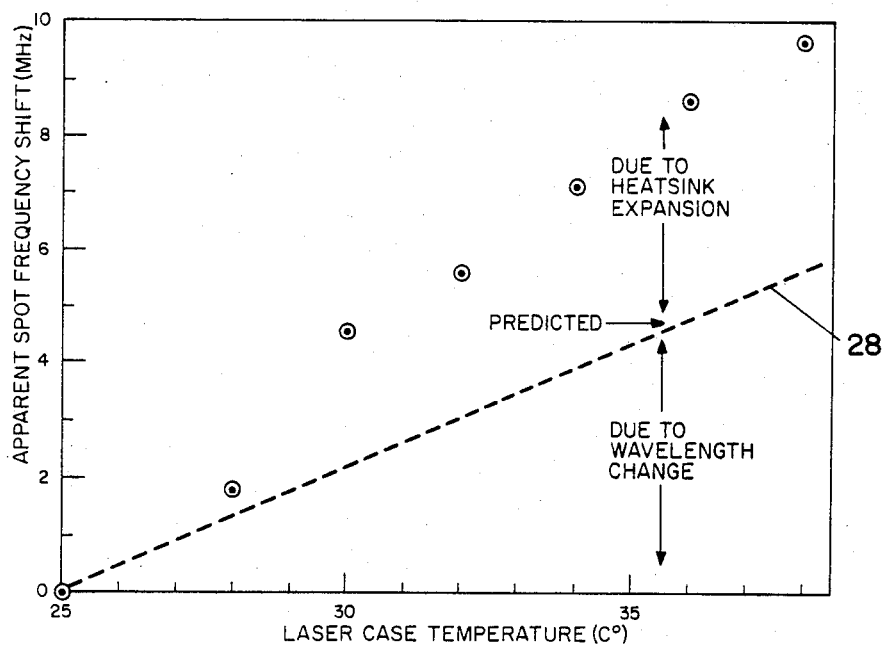
FIG. 3 is an experimental measurement of apparent frequency shift in an acousto-optic device due to temperature variation.

FIG. 3 shows experimental measurements of blur spot displacement as an apparent frequency shift in MHz as a function of laser case temperature in degrees Centigrade for the same laser of FIG. 2. A predicted line 28 indicating blur spot drift is based upon the laser wavelength change. The actual data shows a greater change than the predicted or expected value. It was discovered that this unexpected spot shift of almost twice its expected value reflects an additional contribution to blur spot displacement due to thermal expansion of the laser's heat sink.

After the foregoing discovery, the following Bragg cell equations were considered. The Bragg cell angular output is not only sensitive to changes in RF signal frequency, but also to changes in laser wavelength or frequency. For a fixed laser input angle $\theta_I$, the deflected output beam is diffracted at an exit angle $\theta_x$ given by $$\theta_x \approx \frac{\lambda f}{V} - \theta_I \quad (1)$$

where $\lambda$ is the wavelength of laser light, V is the acoustic velocity of the Bragg cell medium and f is the signal frequency. In normal operation laser wavelength $\lambda$ and acoustic velocity V are essentially constant, and exit angle is proportional only to frequency. By focusing the light via a lens of focal length F into a blur spot in the focal plane, spot position $\chi$ is related to frequency, since $$\chi = F\theta_x \quad (2)$$

Measurement of spot position thereby gives a direct measure of signal frequency. When the ambient temperature is varied, however, additional effects are seen which corrupt or complicate direct frequency measurement. A small change in position or exit angle can be caused not only by signal frequency change but by changes in laser wavelength $\lambda$ or Bragg cell acoustic velocity V due to the temperature change. That is:

$$d\theta_x(df,d\lambda,dV,d\theta_I) = \frac{\lambda}{V} df + \frac{f}{V} d\lambda - \frac{\lambda f}{V^2} dV - d\theta_I \quad (3)$$

The second term reflects changes in the exit angle due to changes in the wavelength of the laser beam due to temperature shift, while the fourth term reflects changes due to the input angle as that angle might depend on temperature. From equation 3, it was confirmed that a heat sink designed to displace the laser in the proper direction can cancel the effect of increasing wavelength within the laser due to temperature. This, in turn, causes an increase in the exit angle from the Bragg cell of the wavelength.

Figure 4:
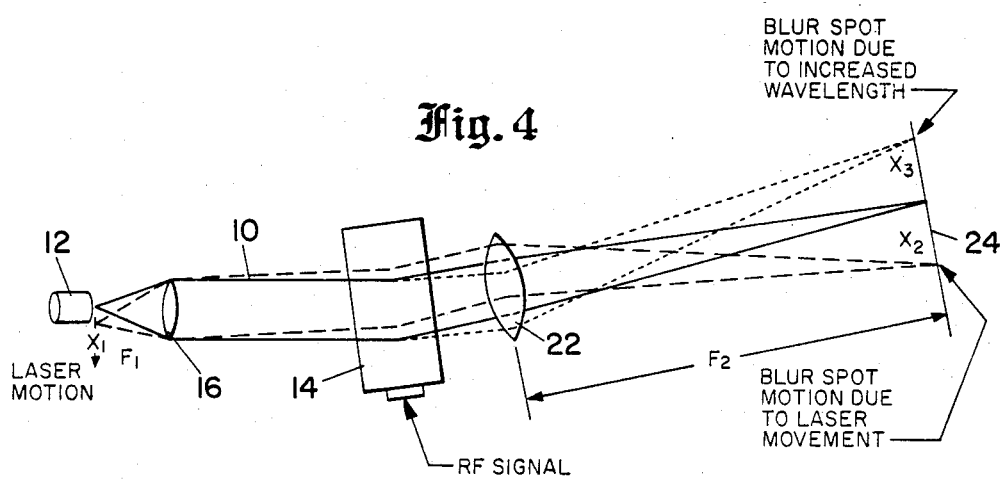
FIG. 4 is a schematic drawing showing the effects of laser motion and laser wavelength temperature drift on a perceived blur spot position.

The mechanism which converts actual laser displacement due to the expansion or contraction of its heat sink into additional perceived frequency error or blur spot displacement is shown in FIG. 4. The laser displacement $X_1$ is changed into angular measure by the laser collimating lens 16 of focal length $F_1$. This angular measure is reconverted by the transform lens 22 of focal length $F_2$ into perceived spot displacement $X_2$. The ratio of laser translation to blur spot displacement is that of the transform lens focal length to collimating lens focal length:

$$X_2 = (F_2/F_1)X_1$$

In FIG. 4 the displacement of the blur spot due to the increase of the wavelength of the laser beam 10 which is then diffracted at a greater exit angle by the Bragg cell 14 is shown at $X_3$. It is desired to balance the displacement $X_2$ by the displacement $X_3$, both of which are dependent on temperature. When both are balanced, the resultant motion of the blur spot due to temperature change is cancelled.

Figure 6A:
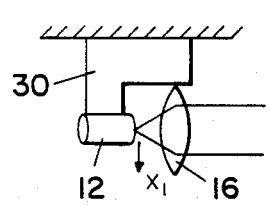
FIGS. 6a and 6b are detailed diagrams showing laser mounting heat sinks useful within the present invention.
Figure 6B:
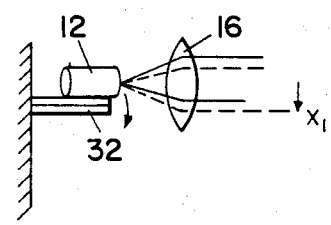
Figure 5:
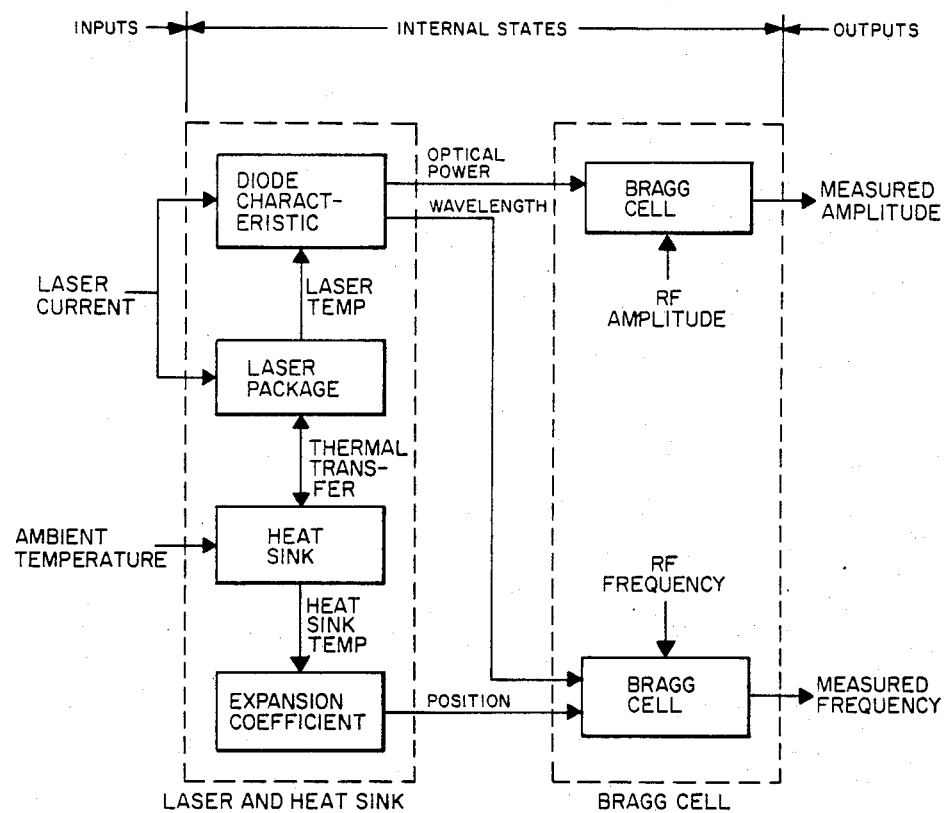
FIG. 5 is a block diagram showing the principal interactions of a laser and a Bragg cell.

FIG. 5 shows a block diagram of the laser source 12 and Bragg cell 14 in this interaction. Inputs to the laser 12 and its heat sink 30, FIGS. 6a and 6b, are current and ambient temperature; inputs to the Bragg cell 14 include RF signal amplitude and frequency. Internal states, which appear as laser and heat sink outputs and thus as inputs to the Bragg cell, include particularly laser optical power, laser wavelength, and laser position. Measured amplitude from the Bragg cell 14 is normally controlled by closed loop control of laser optical power by way of specification of laser input current. Laser current control, through heating, changes both wavelength and laser position. Ambient temperature variation affects all laser outputs: power, wavelength, and position.

The heat sink size, method of mounting and attachment, and materials choice are selectable within wide limits. It is therefore possible to construct the heat sink in a fashion so that blur spot displacement due to laser wavelength change is exactly offset by a position change in the laser which moves the spot in the contrary direction. Perceived frequency error for this type of operation will then be zero.

Referring now to FIG. 6a, a laser 12, such as a solid state GaAs laser, is shown mounted to frame or system ground by a heat sink 30. In FIG. 6a, the heat sink 30 may be a block of temperature expansion material such as copper or brass. In one of the preferred embodiments, a block of copper one cubic centimeter may be used in combination with a 20 power microscope objective lens 16. Here the collimating lens 16 also mounts upon the heat sink 30 so that the source 12 of collimated light 10 moves with the lens 16 through the displacement $X_1$.

In FIG. 6b, GaAs laser 12 is shown mounted upon a bimetal heat sink 32. Here the bimetal strip 32 may be formed from laminated copper and iron to transmit a torsional motion to the laser 12 to change the pointing angle of the beam 10. In this embodiment, the lens 16 is not mounted to the heat sink 32. The precise dimensions of the heat sinks 30 and 32 may be varied to match the temperature dependence curve, FIG. 2, of the designed laser 12. Clearly other variations will be possible within the teachings of the present invention which should be limited only by the appended claims.

We claim:

1. An acousto-optic device utilizing collimated light from a solid state laser that passes through an acousto-optic modulator, comprising:

means for mounting said solid state laser to direct said collimated light toward and through said acousto-optic modulator at an input angle thereto;

said solid state laser generating a beam of collimated light whose wavelength increases as heat within said laser increases;

said acousto-optic modulator causing the diffraction of said collimated light beam to increase as said wavelength of said beam increases for directing said beam from said modulator at an increased exit angle; and said means for mounting said laser including heat sink means to displace said laser and thereby reduce said input angle as heat within said laser increases, wherein said laser displacement reduces said input angle to offset said increase in said exit angle of said beam.

2. An acousto-optic device, as claimed in claim 1, wherein said solid state laser is a gallium arsenide laser.

3. An acousto-optic device, as claimed in claim 1, wherein said heat sink is a block of copper.

4. An acousto-optic device, as claimed in claim 1, wherein said heat sink is a block of brass.

5. An acousto-optic device, as claimed in claim 3, wherein said copper heat sink is a one cubic centimeter block of copper.

6. An acousto-optic device, as claimed in claim 1, additionally comprising:
an objective lens;
said means for mounting said solid state laser further mounting said objective lens;
said means for mounting said laser including a heat sink of one cubic centimeter of copper; and
said objective lens including a twenty power microscope objective lens.

7. An acousto-optic device, as claimed in claim 1, additionally comprising:
an objective lens;
said means for mounting said solid state laser including a heat sink of bimetallic material which directs said beam toward said lens and undergoes a torsional expansion as heat within said means for mounting increases for changing the direction of said beam toward said lens.

8. An acousto-optic device, as claimed in claim 7, wherein said bimetallic material is a strip of iron and copper.

9. Temperature compensation means within an acousto-optic device using a solid state laser to direct a light beam at an input angle toward a Bragg cell which diffracts said beam to exit said cell at an exit angle comprising:
said solid state laser generating said beam with an increasing wavelength as the temperature within said laser increases;
said Bragg cell diffracting said beam at an increased exit angle as said wavelength increases; and
means for mounting said solid state laser including heat sink means which displaces said laser to decrease said input angle of said beam toward said Bragg cell as the temperature within said heat sink increases wherein said displacement of said heat sink and said laser compensates for said increasing wavelength of said laser.

10. Temperature compensation means within an acousto-optic device as claimed in claim 9, additionally comprising:
lens means; and
said means for mounting said solid state laser also mounting said lens and including a block of heat expansive material.

11. Temperature compensation means within an acoustic-optic device as claimed in claim 9, additionally comprising:
lens means; and
said means for mounting said solid state laser including a bimetallic strip for torsionally mounting said laser means to change the angle at which said beam points toward said lens.

* * * * *